Figure 1:
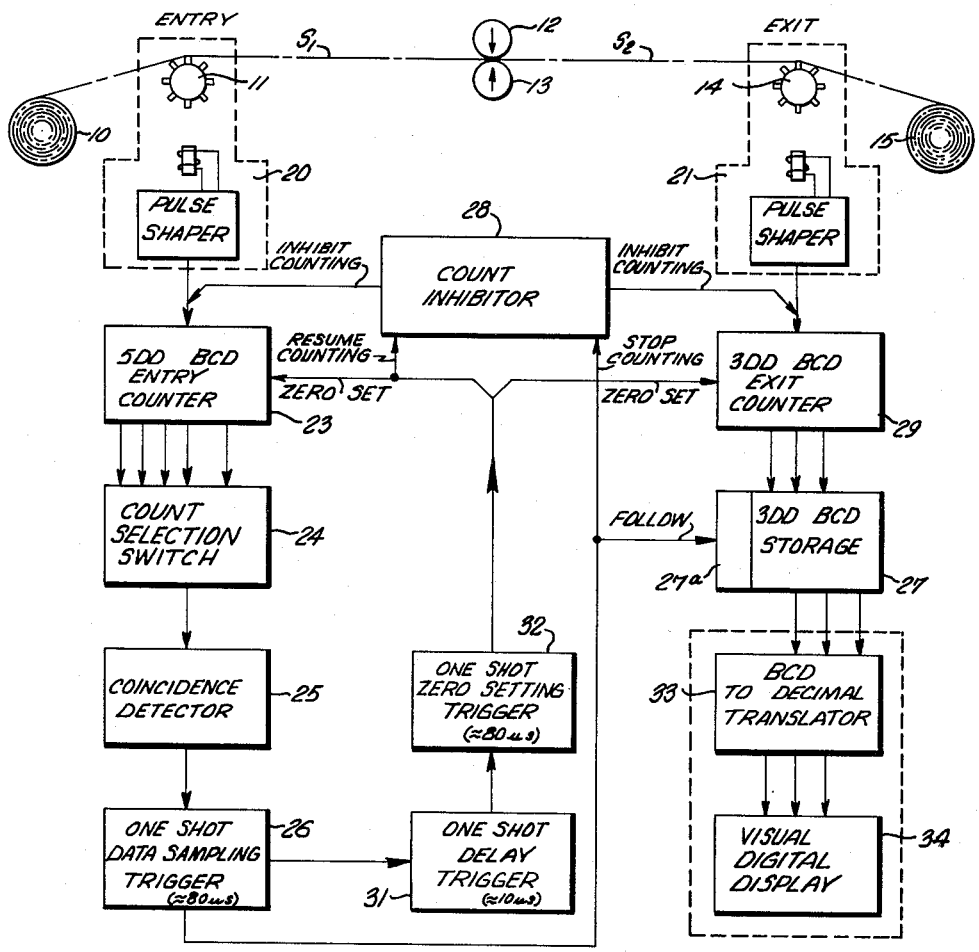

June 30, 1964 G. M. CANOVA ETAL 3,139,236

EXTENSOMETER

Filed Jan. 3, 1961

INVENTORS.
GEORGE M. CANOVA
KENNETH W. CLARKE
BY
Christie, Parker & Hale
ATTORNEYS.

3,139,236
EXTENSOMETER
George M. Canova, Duarte, Calif., and Kenneth W. Clarke, Deerfield, Ill., assignors to Datex Corporation, Monrovia, Calif., a corporation of California
Filed Jan. 3, 1961, Ser. No. 80,337
4 Claims. (Cl. 235—103.5)

This invention relates to an extensometer and more particularly to an extensometer for digitally indicating the extension of steel strip for a rolling mill.

Surface hardness of steel strips has been checked by measuring the extension of the strip as it passes through a rolling mill. The elongation or extension of the strip has been measured by various means including the use of digital techniques. One particular digitally controlled extensometer is described in Patent No. 2,852,195 and which extensometer measures the percentage of extension only at preselected intervals and thereby affords a limited number of samples of the strip being processed. In all of these systems it is desirable to continuously sample the steel strip to determine the extension for improving the quality control of the strip being processed.

The present invention provides an improved digitally controlled extensometer that allows the strip to be continuously sampled to determine the percentage of extension and which sample rate is on the order of twice the sampling rates utilized in previous systems. The invention allows continuous sampling in terms of counting or accumulating signals for determining extension by utilizing circuit means that may be controlled to momentarily accept a signal indicative of the percentage extension while the counting continues substantially simultaneously. This continuous sample rate also implies a minimum time delay and therefore allows the output indication to be further employed in feedback control networks.

The present extensometer may be constructed of reliable solid state devices leading to a highly reliable and accurate arrangement. In addition, since measurements are easily accomplished at low and high speeds, the extensometer of the present invention may be employed in mills where the speeds vary over a wide range.

Structurally, the present invention includes a separate pulse generator for the entry and exit rolls of the mill and which pulse generators provide a number of pulses proportional to the speed of rotation of the exit and entry rolls. Separate pulse counters are utilized to count or accumulate the pulses from the individual pulse generators and which counters are rendered operative during the same intervals. The entry counter is arranged with a count selection switch for selecting a predetermined count and which selection switch and entry counter are coupled to a coincidence detector for providing an output indication at the time interval when the two counts are equal. The output indication from the coincidence circuit is used for providing a triggering signal to a storage circuit that is capable of two modes of operation. The storage circuit is connected to the exit roll counter and normally arranged in a storage mode, and therefore, non-responsive to the exit roll counter. The storage circuit is placed in a follow mode for momentarily responding to the count indications of the exit roll counter during the existence of the coincidence trigger signal. This same triggering signal is employed to actuate a count inhibiting circuit to inhibit the delivery of the pulses to both counters during the brief interval the storage circuit is in a follow mode. This same coincidence triggering signal is utilized in combination with a delay triggering means for resetting the entry and exit counters a preselected time interval after the termination of the triggering signal. The termination of the triggering signal places the storage circuit back in the storage mode and thereby records the state of the exit counter at the time of the coincidence count and during the time interval between pulses generated by the exit roll generator.

The exit counter is selected to merely indicate a preselected number of the lower significant digits of the number of pulses actually provided by the exit pulse generator and which digits are representative of the percentage of the strip extension. The measure of extension recorded in the storage means may be applied to a read out device including visual indicating means for digitally indicating the decimal quantity representative of the percentage of strip extension.

Figure 2:
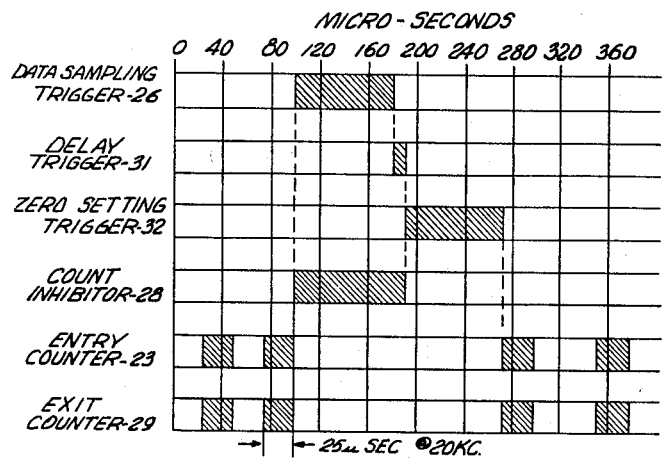

These and other features of the present invention may be more fully appreciated when considered in the light of the following specification and drawings, in which:

FIG. 1 is a block diagram of the extensometer system embodying the invention; and FIG. 2 is a graphical illustration of the timing chart for the system of FIG. 1.

Now, referring specifically to FIG. 1, the extensometer of the present invention will be described. The strip steel $S_1$ to be processed is stored on a storage reel 10 and is delivered by means of an entry roll 11 to a pair of reducing rolls 12 and 13 arranged to receive the strip steel $S_1$ therebetween. The reducing rolls 12 and 13 have a predetermined spacing to change the thickness of the strip $S_1$ passing therethrough. The steel strip emerging from the rolls 12 and 13 at the reduced thickness is identified by the reference character $S_2$ and is delivered to an exit roll 14 to a take-up reel 15 where it is stored. During normal rolling mill operation the exit roll 14 rotates faster than the entry roll 11 due to the reduction in strip thickness. This speed difference is directly related to the strip extension, as is well known.

The present invention contemplates measuring and digitally indicating the strip extension by counting pulses that are generated in accordance with the speed of rotation of the entry roll 11 and take-up roll 14. The strip extension is measured by counting the pulses generated in response to the rotation of the exit roll 14 over a period required to accumulate a predetermined number of pulses generated in response to the rotation of the entry roll 11. This predetermined number of entry roll pulses is a function of the entry and exit roll diameters.

The predetermined number of pulses to be established at the entry side of the mill can be expressed as:

$$C = 10^n(1+A)$$

wherein the exponent $n$ is to be selected as 2, 3, 4, et cetera and A is the percent of extension expressed as a decimal. In a typical example $n$ has been selected to be 4 and the above expression can be represented as:

$$C = 10,000(1+A)$$

and therefore generated by means of the exit roll 14 is $10,000(1+A)$ counts. In a practical system, A has been determined to vary from 0 to 0.05. If A is determined to be .0469, the above expression will then be seen to be $$C = 10,000(1+.0469)$$
$$C = 10,469 \text{ and}$$

the percent of extention, percent A, is 4.69. In accordance with the invention, the numerical value of A only is stored each time the counter for the entry roll 11 reaches a predetermined or preselected count by storing only the last three digits of the accumulated pulses from the exit roll 14.

To implement this arrangement, the entry roll 11 and the exit roll 14 are provided with pulse generators 20 and 21 coupled thereto. The pulse generators 20 and 21 may comprise heavy-duty magnetic generators which emit pulses at a rate proportional to the revolutions per minute of these rolls 11 and 14. The pulse generators are of commercially available construction and may provide on the order of 180 electrical impulses per revolution of the rolls 11 and 14 and would include pulse shapers for shaping the generated pulses for counting purposes. The pulse generator 20 is coupled to an entry counter 23 which may be a binary coded decimal counter and have a capacity for recording five decimal digits, that is, the 10,000 counts in the above example. It will be recognized that the counters may be of conventional construction whereby the count indication is indicated by a pattern of output signals therefrom for representing the decimal count thereof. This pattern of output signals from the various stages representative of different decimal orders of the entry counter 23 is coupled to a count selection switch 24. The count selection switch 24 is connected in series circuit relationship with the output indications from the entry counter 23 and is, accordingly, provided with the same number of stages (five) for indicating each decimal digit of the entry counter. The selection switch 24 is, in turn, coupled to a coincidence detector 25. The input circuits for the coincidence detector comprise the output circuits of the selection switch 24 whereby when the selector switch for any one stage is set to the same count as the count indicated by the corresponding stage of the entry counter 23, a complete circuit will be provided through the selector switch 24 to the coincidence detector 25. In this same fashion, when each of the five decimal stages of the counter 23 are the same as the selected count for each of the decimal orders of the selector switch 24, an output indication from the coincidence detector 25 will be provided.

The output indication from the coincidence detector 25 is, in turn, coupled to triggering means shown in the form of a monostable switching circuit 26. The monostable switching circuit 26 is commonly referred to as a one shot multivibrator and is further identified in the drawing as a one shot data sampling trigger. The output signal from the monostable switching circuit 26 is coupled in parallel circuit relationship to a store-follow circuit 27 and a count inhibiting circuit 28. The store-follow circuit 27 is switchable between a follow mode for continuously responding to signals applied thereto and a storage mode wherein the circuit is rendered nonresponsive to the signals delivered thereto and stores the last binary signal applied thereto before the circuit was placed in the storage mode. Associated with the storage circuit 27 is a control circuit means 27a generally in the form of a bistable element which receives the control signals from the monostable switching circuit 26 for placing the control means in a preselective state to correspondingly place the storage circuit in either the storage or follow mode. The control means 27a is normally arranged to maintain the store-follow circuit 27 in a storage mode. A more detailed description of the store-follow circuit may be had by reference to the co-pending patent application of Carl P. Spaulding and M. Carr Wilson entitled "Digital Circuits," filed on April 13, 1959, bearing Serial No. 805,868 and assigned to the same assignee as the present invention.

The output indication from the monostable switching circuit 26 actuates a count inhibitor 28 whereby an output indication therefrom is applied in parallel circuit relationship to the input circuits of the entry counter 23 and an exit counter 29 to prevent the entry of pulses thereto in a conventional fashion. The exit counter 29 is coupled to receive the pulses from the pulse generator 21 and which generator is coupled to be responsive to the rotation of the exit roll 14. The application of the output indication from the monostable switching circuit 26 to the count inhibiting circuit 28 thereby causes the generated pulses from elements 20 and 21 to be blocked whereby the counters 23 and 29 are maintained in their present state and counting pattern.

The monostable switching circuit 26 is also coupled to a delay circuit means 31 for providing a predetermined delay and which delay circuit 31 is, in turn, coupled to another monostable switching circuit 32. The monostable switching circuit 32 is of the same general configuration as the circuit 26 and is maintained in its one state for substantially the same length of time as the circuit 26, that is, the duration of the output indication from the monostable switching circuit 32 is of substantially the same time duration as that from the circuit 26. The output indication from the monostable circuit 32 is coupled in parallel fashion to the entry counter 23 and the exit counter 29 for resetting each of these counters to zero. In addition, this same output indication is coupled to the count inhibiting circuit 28 for resetting it into a non-inhibiting mode to allow the counters 23 and 29 to resume counting.

It should be noted that the exit counter 29 is also a binary coded decimal counter, only it has a capacity that is less than the capacity of the entry counter 23. The exit counter 29 merely records the three least significant decimal digits. These three decimal digits, it will be recalled, represent the percent of extension A.

The binary coded decimal pattern from the exit counter 29 is delivered in parallel circuit relationship to the store-follow circuit 27 for storage therein. The output indications from the store-follow circuit 27 may be coupled to a visual readout means for decimally indicating the percentage of extension to the mill operator. For this purpose, the visual indicating means may require a binary coded decimal to decimal translator such as the one represented by the block 33. The decimal indication from the translator 33 may then be applied to a visual read-out device which may comprise a lamp bank responsive to these input indications for digitally indicating the value of the stored decimal digits and thereby the percent of extension. Such an element is indicated by the block 34 for identifying the visual indicating element.

With the above structure in mind, the operation of the extensometer for a single sampling will be examined in conjunction with the timing diagram of FIG. 2. It will be understood that for any one setting of the switch 24 the operation of successive samplings will be the same. For the purposes of describing the invention, it will be assumed that the monostable switching circuits 26 and 32 provide an output indication for a time interval of approximately 80 microseconds, while the delay circuit 31 provides a time delay of approximately 10 microseconds, as shown in FIG. 2. It will further be assumed that the selection switch 24 has been set to the predetermined count of 10,000, as discussed hereinabove.

As the strip $S_1$ is passed over the entry roll 11, the pulse generator 20 is activated whereby the pulses are generated in accordance with the speed of rotation thereof and which pulses are applied to the entry counter 23 to count it up. During this same interval, the strip $S_1$ passes through the reduction rolls 12 and 13 and, as the reduced strip $S_2$ passes over the exit roll 14, it actuates the pulse generator 21 whereby pulses are delivered to the exit counter 29 and which counter is also counted up. When the output pattern from the entry counter 23 indicates the decimal count of 10,000, the point of coincidence has been reached and the corresponding plurality of output indications from the selection switch 24 will be applied to the coincidence detector 25 whereby the detector provides the desired coincidence output indication. This coincidence output indication triggers the one-shot data sample trigger 26 whereby it provides an output indication of approximately 80 microseconds duration. This output indication switches the control circuit means 27a to its follow state whereby the store-follow circuit 27 is placed in the follow mode during this 80 microsecond interval. At this same time, the 80 microsecond output indication from the circuit 26 is applied to the count inhibiting circuit 28 and provides the inhibiting signal whereby the pulses from the generators 20 and 21 do not count up their respective counters 23 and 29, and causes the accumulated count of the exit counter 29 to be stored in the storage circuit 27. The exit counter 29 may have counted through 10,469 counts while the entry counter accumulated the 10,000 counts and only the digits 469 will have been stored in the store-follow circuit 27. At the termination of the 80 microsecond signal, the control circuit 27a will return to its storage mode and thereby place the store-follow circuit 27 also in the storage mode. Therefore, the three decimal digits representative of the percent of extension of the steel strip will have been recorded in the store-follow circuit 27. During this interval the 80 microsecond signal from the switching circuit 26 is applied to the delay circuit 31 and is delayed for approximately 10 microseconds before being applied to the corresponding 80 microseconds trigger circuit 32. That is, approximately 90 microseconds after coincidence has been detected, the entry and exit counters 23 and 29 respectively are reset to zero by this signal and the count inhibiting circuit has been deactivated whereby the counters 23 and 29 will once again accumulate pulses from the generators 20 and 21.

For the purposes of visually indicating the stored percent of extension, A, (469) the output indications from the store-follow circuit 27 are translated from binary coded decimal form to decimal by the translator 33 and applied to a visual indicating element 34. An important aspect of the visual digital display is that the information stored in the store-follow circuit 27 is not changed during successive samplings of the strip and therefore the visual display is stationary during this interval eliminating the reading of the lamp bank 34 during constant flipping thereof.

It will now be evident that the present invention has advanced the state of the extensometer art through the provision of a digital system that continuously samples and indicates the extension of a strip passing through a rolling mill. The accuracy of the digital control is well within the accuracies afforded by the conventional mill equipment and, since highly reliable solid state and static devices may be employed, long periods of operation without maintenance are insured. The increased resolution of the present invention further allows it to be employed in closed loop type of control systems.

What is claimed is:

1. A high speed electronic extensometer for determining the amount of extension of a strip passing through a rolling mill comprising an entry roll over which the strip passes before entering the mill, an exit roll over which the strip passes after leaving the mill, a separate pulse generator driven by said entry and exit rolls providing pulses at a rate proportional to the speeds of rotation thereof, an entry and exit binary coded decimal electronic counter connected to an individual one of said generators for counting the pulses therefrom, switching means for selecting a predetermined decimal count for the entry counter, means for indicating coincidence between the count of said entry counter and the selected position of the switching means and providing an output indication thereof upon coincidence, monostable electronic switching circuit means connected to be responsive to said coincidence output indication and switchable in response thereto for providing an output signal therefrom of a preselected time duration, binary coded decimal electronic storage circuit means connected to receive the output indications from said exit counter and switchable between a follow mode for continuously responding to the counter indications and a storage mode for rendering same non-responsive to the counter indications for storing a preselected count, bistable electronic circuit means directly connected to said storage means for switching same between the follow and storage modes in accordance with the state thereof and normally arranged in a state for maintaining the storage means in the storage mode and connected to be responsive to the output signal from said monostable switching means to place said storage means in the follow mode to accept the indications from said exit counter only during the existence thereof, count inhibiting means also connected to be responsive to said output signal from said monostable switching means susbtantially simultaneously with said storage means and connected in parallel circuit relationship with each of said counters for inhibiting the counting thereof only during the existence thereof, another monostable electronic switching circuit means arranged to remain in said one state for providing an output signal for a time duration substantially the same as for the first-mentioned monostable circuit means and connected to provide the output signal to each of said counters substantially simultaneously, and delay circuit means connected intermediate said monostable switching circuits and having a time delay whereby said counters are reset substantially simultaneously a preselected interval after the storage of the count of the exit counter in said storage means.

2. An extensometer for determining the amount of extension of a strip passing through a rolling mill as defined in claim 1 wherein the output signal from said first-mentioned monostable switching circuit means has a time duration related to the time interval between the pulses generated by the exit roll to allow the storage of the count of the exit counter during the exit roll pulse intervals and thereby substantially continuously sample the strip extension.

3. An extensometer for digitally indicating the amount of extension of a strip passing through a rolling mill as defined in claim 1 wherein the entry counter is a binary coded decimal counter having a preselected number of decimal orders and the exit counter is a binary coded decimal counter having a preselected number of decimal orders less than the number for the entry counter and corresponding to the least significant decimal orders thereof, the decimal digits stored in said circuit means digitally representing the percentage of extension of the strip passing through the mill, and means connected to said circuit means for visually indicating the decimal digits representing the percentage of extension of the strip.

4. An extensometer for digitally indicating the amount of extension of a strip passing through a rolling mill as defined in claim 3 wherein said visual indicating means includes a binary coded decimal to decimal translator for energizing the visual indicating means accordingly.

References Cited in the file of this patent

UNITED STATES PATENTS

| | | |
|---|---|---|
| 2,516,189 | Dinsmore | July 25, 1950 |
| 2,852,195 | Coleman et al. | Sept. 16, 1958 |
| 2,874,900 | Linderman | Feb. 24, 1959 |

OTHER REFERENCES

Lopez: (Allis Chalmers Mfg. Co.), article in Allis Chalmers Electrical Review, Third Quarter, 1960 (pp. 4–7).